(12) United States Patent
Chen

(10) Patent No.: US 8,419,221 B2
(45) Date of Patent: Apr. 16, 2013

(54) KEYBOARD WITH ADJUSTABLE TOP SURFACE TEMPERATURE FUNCTION

(75) Inventor: Qiang Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 351 days.

(21) Appl. No.: 12/913,794

(22) Filed: Oct. 28, 2010

(65) Prior Publication Data
US 2012/0033427 A1    Feb. 9, 2012

(30) Foreign Application Priority Data
Aug. 3, 2010    (CN) .......................... 2010 1 0243702

(51) Int. Cl.
*F21V 33/00*    (2006.01)
*F21V 29/00*    (2006.01)

(52) U.S. Cl.
USPC .............................. 362/253; 362/89; 219/209

(58) Field of Classification Search .................... 362/89, 362/253; 219/209
See application file for complete search history.

(56) References Cited

U.S. PATENT DOCUMENTS
5,828,034 A * 10/1998 Chang ............................ 219/209
6,646,226 B1 * 11/2003 Reitz ............................ 219/209

* cited by examiner

*Primary Examiner* — David V Bruce
(74) *Attorney, Agent, or Firm* — Altis Law Group, Inc.

(57) ABSTRACT

A keyboard includes a housing, which includes a front surface, a rear surface, and a top surface. The top surface has a key zone. A number of keys formed on the key zone. An air inlet is defined in the rear surface. A number of air outlets are defined in the key zone. A fan is received in the housing adjacent to the air inlet. The fan is configured for forcing air to flow into the housing through the air inlet. A heating element is positioned in the housing and configured to heat up the air in the housing. A switch is configured to switch on or off the heating element.

20 Claims, 4 Drawing Sheets

KEYBOARD WITH ADJUSTABLE TOP SURFACE TEMPERATURE FUNCTION

BACKGROUND

1. Technical Field

The present disclosure is in the field of computer peripheral devices, and pertains more particularly to keyboards.

2. Description of Related Art

There is an increased demand for keyboard input devices not only working well with a computer, but which also work well with the user. When the computing devices are used in hot or cold environments, the user may experience efficiency reductions due to the temperatures from having to remove their hands from the keyboard to warm them or wipe them off.

What is needed, therefore, are keyboards that the top surface temperature can be adjusted to overcome the above shortcomings.

BRIEF DESCRIPTION OF THE DRAWINGS

Many aspects of the present keyboard can be better understood with reference to the following drawings. The components in the drawings are not necessarily drawn to scale, the emphasis instead being placed upon clearly illustrating the principles of the present keyboard. Moreover, in the drawings, like reference numerals designate corresponding parts throughout the views.

DETAILED DESCRIPTION

Figure 1:
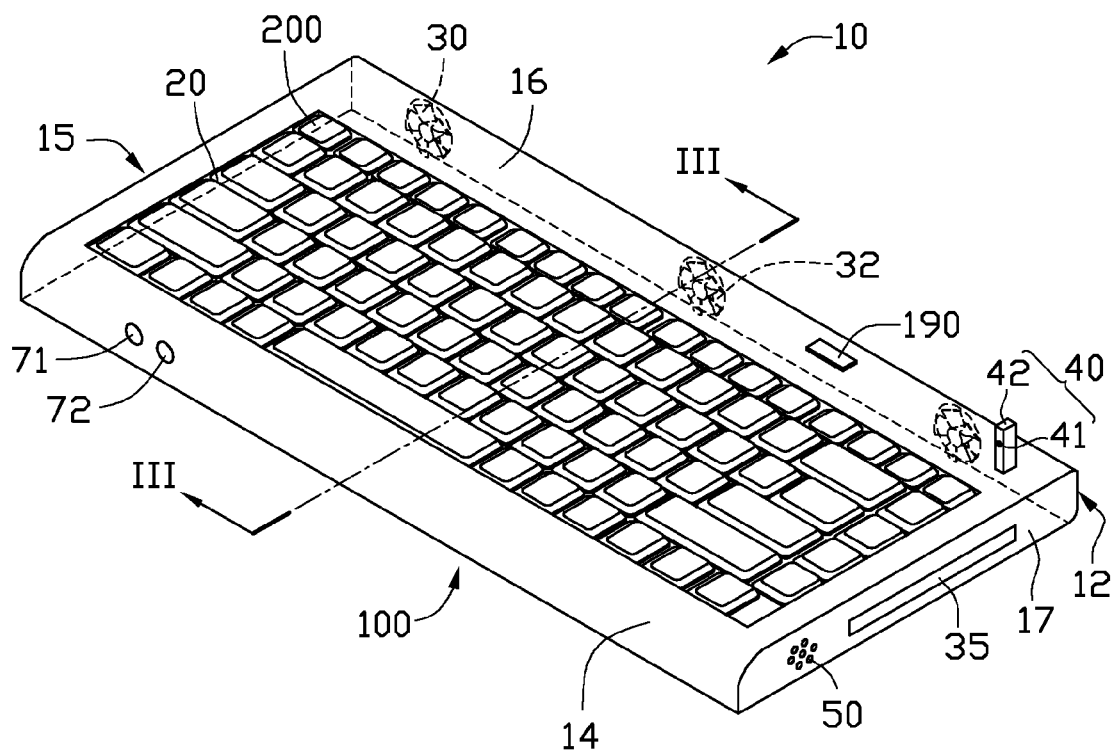
FIG. 1 is a schematic isometric view of a keyboard with a light source pulled up in accordance with a first exemplary embodiment.
Figure 2:
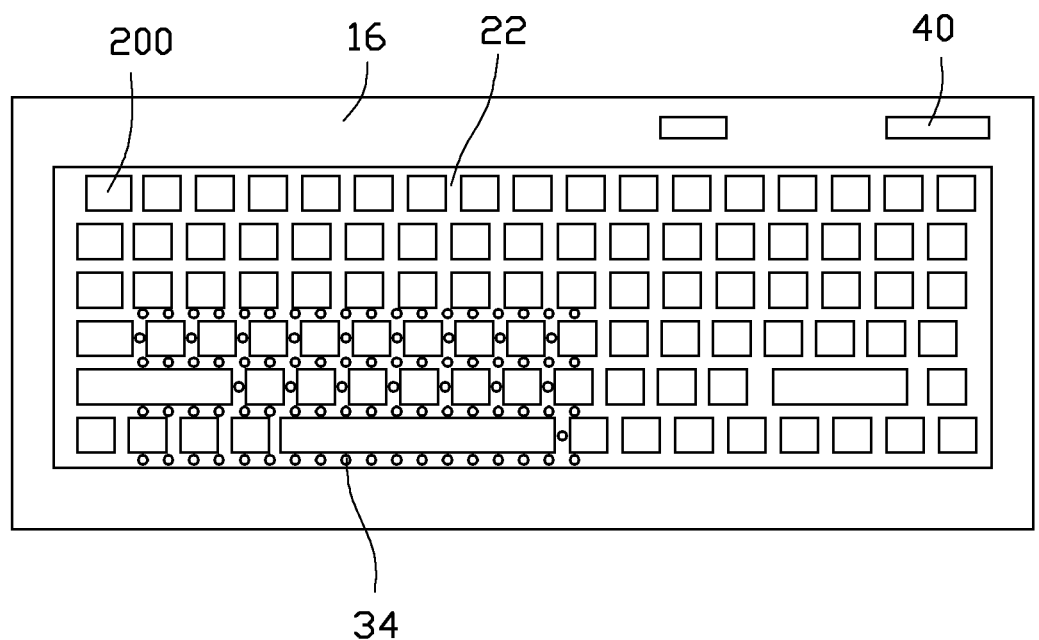
FIG. 2 is a top view of the keyboard illustrated in FIG. 1.
Figure 3:
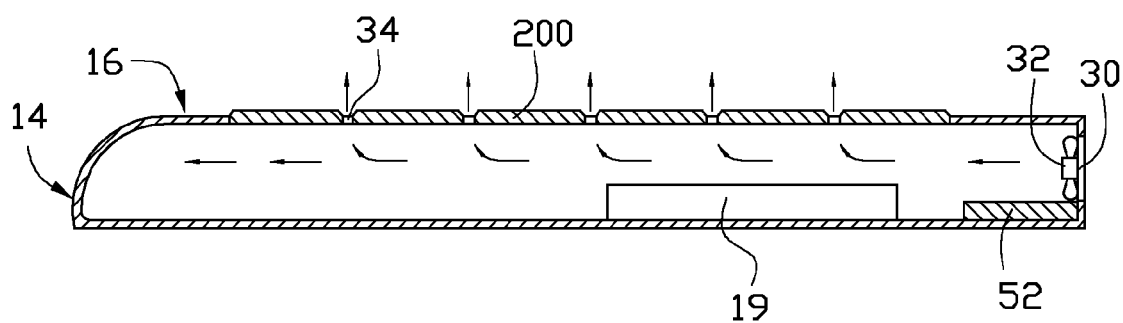
FIG. 3 is a cross-sectional view of the keyboard shown in FIG. 1, taken along line III-III, illustrating how the air escapes through the outlets.

Referring to the FIGS. 1-3, a keyboard 10 in accordance with a first embodiment is a free-standing input device connected to a computer system (not shown) by means of a cable, an appropriate type of a connector or by a wireless or cordless component (not shown).

The keyboard 10 includes a housing 100. The housing 100 has a rear surface 12 at one side of the keyboard 10, a front surface 14 at an opposite side of the keyboard 10, a left side surface 15, a right side surface 17, and a top surface 16. A key zone 20 and a blank zone 22 are defined in the top surface 16. The blank zone 22 is the area in the top surface 16 free of keys arranged thereon. A number of keys 200 are formed on the key zone 20. The keys 200 include alphabetic characters, punctuation symbols, numbers and a variety of function keys. In this embodiment, the keyboard 10 is QWERTY-based layout.

At least one air inlet 30 is defined in the rear end surface 12. A number of air outlets 34 are defined in the key zone 20. The keyboard 10 also includes at least one fan 32. The fans 32 are received in the housing 100 and in the immediate vicinity of the air inlet 30. Air is drawn into the inside of the keyboard 10 via fans 32 to adjust the temperature of the top surface 16. The fans 32 are configured for forcing air to flow into the housing 100 through the air inlet 30 along a line substantially parallel to the top surface 16, and escape from the air outlets 34 along a line substantially perpendicular to the top surface 16. The air passing through the inside will accelerate the air flowing between the internal and external of the keyboard 10. There are few of elements dissipating heat located in the inside, thus the air will cool the top surface 16 as well as the user's hands when operating the keyboard 10.

The air outlets 34 are open around each key 200, particularly, open around the keys often used. Referring to FIG. 2, each key 200 has a size of 12 mm*14 mm, the distance between two adjacent keys 200 are 6 mm. Alphabetical keys which are often used, for example, A, S, D, F, J, K, L, Z, X, C, V, N, and M keys are equipped with at least one air outlet 34. The air outlets 34 may also be open around the Space bar. The air outlet 34 may be circular. The diameter of the air outlet 34 is about 1 mm (the diameter is exaggerated in the drawings for clarity). The diameter of 1 mm keeps the keyboard 10 from leaking liquid into the inside of the keyboard 10. Furthermore, the air blown out of the air outlet 34 will also blow the liquid out if any comes in contact with the air outlets 34.

Each key 200 closely contacts with the blank zone 22 to keep the dust or small particles from falling into the inside of the keyboard 10. The air outlets 34 are open at the blank zone 22.

A heating element 52 is positioned in the housing 100 to heat the air in the housing. A switch 190 is defined in the top surface 16 to switch on or off the heating element 52. When the keyboard 10 is used in a cold environment, the heating element 52 is switched on. The air escaping through the air outlets 34 will warm the hands. The switch 190 may be attached to the rear surface 12, the front surface 14, or the other proper position in the keyboard 10. The heating element 52 is supplied with power by the same way as supplying the keyboard 10. The heating element 52, in this embodiment, is a heat resistor.

Furthermore, a light source 40 includes a post 42 pivotedly mounted on the top surface 20 of the housing 100 and a lamp 41 attached to a free end of the post 42. The lamp 41 may deploy one or more LEDs. When it is dark, the light source 40 can be pulled up to illuminate the keyboard 10. The light source 40 may have a separate, direct power connection to an outside power source (not shown), or the light source 40 may be powered by the power connection to the computer by a step-up power converter.

On the keyboard 10 there are also two loudspeakers 50 mounted in the left side surface 15 and the right side surface 17, respectively. A USB audio decoding unit 19 is set inside the housing 100. A microphone interface 71 and a headset interface 72 are defined in any one of the top surface 16, the rear surface 12, the front surface 14, the left side surface 15, and the right side surface 17. A DVD-ROM 35 may be embedded in the housing 100 from any one of the rear surface 12, the front surface 14, the left side surface 15, and the right side surface 17. The keyboard 10 assembled with the DVD-ROM 35, the microphone interface 71, and the headset interface 72 usually assembled in a computer provides convenience for users operating the computer.

It is noteworthy that there may be only one air outlet 34 defined in the blank zone 22 to exhaust the air and help the user's hands warm or cool, depending whether the heating element 52 is switched on.

Figure 4:
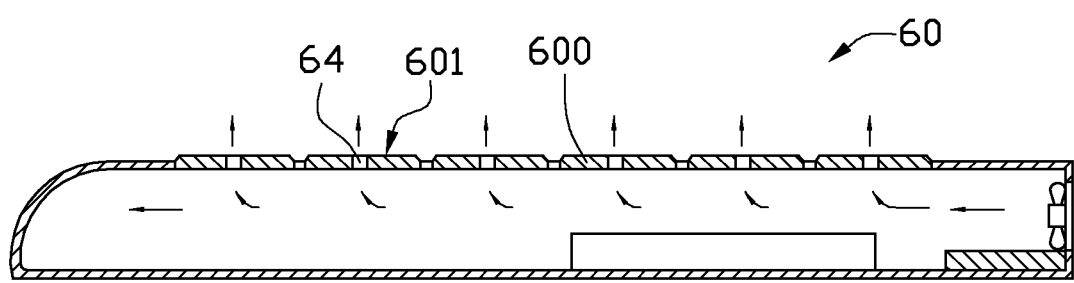
FIG. 4 is similar to FIG. 3, but illustrating a keyboard in accordance with a second embodiment, showing how the air escapes from pressing caps of the keys.

FIG. 4 illuminates a keyboard 60 of a second embodiment. Each key 600 has a pressing cap 601. The main difference between the keyboard 60 and the keyboard 10 is at least one air outlet 64 is opened in the pressing cap 601 of a corresponding key 600. The size of the air outlet 64 is smaller than that of the pressing cap 601. The air outlets 64 may open in the keys often used, for example, A, S, D, F, J, K, L, Z, X, C, V, N, and M keys.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A keyboard comprising:
   a housing including a front surface, a rear surface, and a top surface, the top surface having a key zone;
   a plurality of keys formed on the key zone;
   an air inlet defined in the rear surface;
   a plurality of air outlets defined in the key zone;
   a fan received in the housing adjacent to the air inlet, the fan configured for forcing air to flow into the housing through the air inlet;
   a heating element positioned in the housing and configured to heat up the air in the housing; and
   a switch configured to switch on or off the heating element, wherein the keyboard has a QWERTY-based layout, and the air outlets are arranged around each of the A, S, D, F, J, K, L, Z, X, C, V, N, and M keys.

2. The keyboard according to claim 1, wherein the top surface further comprises a blank zone free of keys arranged thereon, the air outlets defined in the blank zone.

3. The keyboard according to claim 1, wherein each of the air outlets is circular, and the diameter of the air outlets is about 1 mm.

4. The keyboard according to claim 1, wherein the switch is arranged on one of the top surface, the front surface, and the rear surface.

5. The keyboard according to claim 1, further comprising a light source, the light source including a post pivotedly mounted on the top surface of the housing and a lamp attached to a free end of the post.

6. The keyboard according to claim 1, further comprising a USB audio decoding unit positioned in the housing, and two loudspeakers mounted on opposite sides of the housing.

7. The keyboard according to claim 1, wherein a DVD-ROM is embedded in the housing.

8. A keyboard comprising:
   a housing including a front surface, a rear surface, and a top surface, the top surface having a key zone;
   a plurality of keys formed on the key zone;
   an air inlet defined in the rear surface;
   a plurality of air outlets defined in the key zone, wherein the air outlets surround every key;
   a fan received in the housing adjacent to the air inlet, the fan configured for forcing air to flow into the housing through the air inlet;
   a heating element positioned in the housing and configured to heat up the air in the housing; and
   a switch configured to switch on or off the heating element.

9. The keyboard according to claim 8, wherein each of the air outlets is circular, and the diameter of the air outlets is about 1 mm.

10. The keyboard according to claim 8, wherein the fan is positioned on the heating element.

11. The keyboard according to claim 8, wherein the switch is arranged at a position selected from the group consisting of the top surface, the front surface, and the rear surface.

12. The keyboard according to claim 8, further comprising a light source, the light source including a post mounted on the top surface of the housing and a lamp attached to the post.

13. A keyboard comprising:
   a housing including a front surface, a rear surface, and a top surface, the top surface having a key zone;
   a plurality of keys formed on the key zone, each key comprising a pressing cap;
   an air inlet defined in one of the rear surface, the front surface, and the top surface;
   a plurality of air outlets defined in the pressing caps of at least two of the plurality of keys;
   a fan adjacent to the air inlet, the fan configured for forcing air to flow into the housing through the air inlet;
   a heating element positioned in the housing and configured to heat up the air in the housing; and
   a switch configured to switch on or off the heating element.

14. The keyboard according to claim 13, wherein each air outlet is defined in the pressing cap of every key.

15. The keyboard according to claim 13, wherein the keyboard has QWERTY-based layout, and the air outlets are defined in the pressing caps of each of the A, S, D, F, J, K, L, Z, X, C, V, N, and M keys.

16. The keyboard according to claim 13, wherein each of the air outlets is circular, and the diameter of the air outlets is about 1 mm.

17. The keyboard according to claim 13, wherein the fan is received in the housing and positioned adjacent to the rear surface of the housing.

18. The keyboard according to claim 17, wherein the fan is positioned on the heating element.

19. The keyboard according to claim 13, wherein the switch is arranged at a position selected from the group consisting of the top surface, the front surface, and the rear surface.

20. The keyboard according to claim 13, further comprising a light source, the light source including a post mounted on the top surface of the housing and a lamp attached to the post.

* * * * *